(12) United States Patent
Lavertu et al.

(10) Patent No.: US 10,190,509 B2
(45) Date of Patent: Jan. 29, 2019

(54) SYSTEM AND METHOD FOR CONTROLLING A DUAL FUEL ENGINE

(71) Applicant: General Electric Company, Schenectady, NY (US)

(72) Inventors: Thomas Michael Lavertu, Clifton Park, NY (US); Roy James Primus, Niskayuna, NY (US); Adam Edgar Klingbeil, Ballston Lake, NY (US); James Robert Mischler, Girard, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 1417 days.

(21) Appl. No.: 14/138,200

(22) Filed: Dec. 23, 2013

(65) Prior Publication Data

US 2015/0176509 A1 Jun. 25, 2015

(51) Int. Cl.
*F02D 19/10* (2006.01)
*F02D 19/06* (2006.01)
*F02D 19/08* (2006.01)
*F02D 41/02* (2006.01)
*F02D 41/14* (2006.01)
(Continued)

(52) U.S. Cl.
CPC ....... *F02D 19/061* (2013.01); *F02D 19/0647* (2013.01); *F02D 19/081* (2013.01); *F02D 41/0025* (2013.01); *F02D 41/0027* (2013.01); *F02D 41/0205* (2013.01); *F02D 41/1446* (2013.01); *F02D 41/1458* (2013.01); *F02D 41/18* (2013.01); *F02B 3/06* (2013.01); *F02D 35/023* (2013.01); *F02D 35/027* (2013.01); *F02D 2200/0414* (2013.01);
(Continued)

(58) Field of Classification Search
CPC ............... F02D 19/061; F02D 41/0205; F02D 41/1446; F02D 41/1458; F02D 41/18; F02D 41/0025; F02D 41/0027; F02D 19/0647; F02D 19/081; F02D 35/023; F02D 35/027; F02D 2200/0414; F02D 2200/10; Y02T 10/36
See application file for complete search history.

(56) References Cited

U.S. PATENT DOCUMENTS 3,900,012 A 8/1975 Wahl et al.
4,171,691 A * 10/1979 Nohira ................ F02D 41/0052
123/568.22
(Continued)

FOREIGN PATENT DOCUMENTS

EP 1024263 B1 1/2002

OTHER PUBLICATIONS

U.S. Appl. No. 14/858,523, filed Sep. 18, 2015, Roy James Primus et al.
(Continued)

*Primary Examiner* — Hung Q Nguyen
(74) *Attorney, Agent, or Firm* — McCoy Russell LLP

(57) ABSTRACT

A method includes receiving a plurality of signals from a plurality of sensors coupled to a dual fuel engine. The method further includes altering an actual speed of the dual fuel engine to obtain a predetermined air-fuel ratio in response to a changed operating condition of the dual fuel engine determined based on the plurality of signals, so as to maintain operation of the dual fuel engine between knock and misfire conditions.

29 Claims, 5 Drawing Sheets

US 10,190,509 B2
Page 2

(51) Int. Cl.
  *F02D 41/18* (2006.01)
  *F02D 41/00* (2006.01)
  *F02B 3/06* (2006.01)
  *F02D 35/02* (2006.01)

(52) U.S. Cl.
  CPC ............... *F02D 2200/1015* (2013.01); *F02D 2200/703* (2013.01); *Y02T 10/36* (2013.01)

(56) References Cited

U.S. PATENT DOCUMENTS

| | | | |
|---|---|---|---|
| 4,213,435 | A | 7/1980 | Simko |
| 5,168,853 | A | 12/1992 | Kittelson et al. |
| 5,450,829 | A * | 9/1995 | Beck .................. F02D 19/0631 123/435 |
| 5,901,683 | A | 5/1999 | Patel |
| 6,009,709 | A | 1/2000 | Bailey |
| 6,493,627 | B1 | 12/2002 | Gallagher et al. |
| 6,742,506 | B1 | 6/2004 | Grandin |
| 6,899,090 | B2 | 5/2005 | Arnold |
| 6,945,047 | B2 | 9/2005 | Shea et al. |
| 6,945,236 | B2 | 9/2005 | Nakai et al. |
| 7,055,504 | B1 | 6/2006 | Gallagher et al. |
| 7,246,604 | B2 | 7/2007 | Cullen |
| 7,296,555 | B2 | 11/2007 | Tamma et al. |
| 7,360,523 | B2 | 4/2008 | Sloane et al. |
| 7,444,815 | B2 | 11/2008 | Baumgard et al. |
| 7,565,892 | B1 | 7/2009 | Cleary et al. |
| 7,726,287 | B2 | 6/2010 | Sekfane |
| 8,060,293 | B2 | 11/2011 | Meyer et al. |
| 8,078,384 | B2 | 12/2011 | Glugla et al. |
| 8,307,646 | B2 | 11/2012 | Cattani et al. |
| 8,439,021 | B2 | 5/2013 | Vuk |
| 8,589,002 | B1 | 11/2013 | Henry et al. |
| 2002/0112478 | A1 | 8/2002 | Pfluger |
| 2006/0096273 | A1 | 5/2006 | Soliman et al. |
| 2006/0162320 | A1 | 7/2006 | Surnilla et al. |
| 2007/0261391 | A1 | 11/2007 | Takubo |
| 2009/0099753 | A1 | 4/2009 | Kaneko |
| 2009/0118973 | A1 | 5/2009 | Gillespie et al. |
| 2009/0199825 | A1 | 8/2009 | Piper et al. |
| 2010/0236532 | A1 | 9/2010 | Xiao et al. |
| 2010/0299049 | A1 | 11/2010 | Kang et al. |
| 2011/0000470 | A1 | 1/2011 | Roth |
| 2011/0083641 | A1 | 4/2011 | Gokhale et al. |
| 2011/0131957 | A1 | 6/2011 | Hepburn et al. |
| 2011/0307127 | A1 | 12/2011 | Swenson et al. |
| 2012/0055457 | A1 | 3/2012 | Wong et al. |
| 2012/0234303 | A1 | 9/2012 | Born et al. |
| 2013/0030672 | A1 | 1/2013 | Klingbeil et al. |

OTHER PUBLICATIONS

U.S. Appl. No. 13/655,764, filed Oct. 19, 2012, Roy James Primus et al.

Stelmasiak et al., "Some Aspects of Control Charge Quality in a Dual Fuel Diesel Engine Fuelled with CNG and Diesel Oil", Journal of Kones, pp. 226-233 vol. 11, Issue 3-4, 2004.

Wu, "Performance Simulation and Control Design for Diesel Engine NOx Emission Reduction Technologies", University of Illinois at Urbana-Champaign, pp. 168, 2011.

Australian Office Action issued in connection with corresponding AU Application No. 2013245468 dated Jul. 15, 2016.

\* cited by examiner

SYSTEM AND METHOD FOR CONTROLLING A DUAL FUEL ENGINE

BACKGROUND

The invention relates generally to engines used in vehicles, and more particularly, to a system and method for controlling a dual fuel engine.

In a compression-ignition engine, such as a diesel engine, a fuel injection system injects fuel (e.g. diesel fuel) into compressed air within each of the engine cylinders to create an air-fuel mixture that ignites due to the heat and pressure of compression. Unfortunately, engine efficiency, power output, fuel consumption, exhaust emissions, and other operational characteristics are less than ideal. In addition, conventional techniques to improve one operational characteristic often worsen one or more other operational characteristic. For example, attempts to decrease specific fuel consumption often cause increases in various exhaust emissions. Vehicle exhaust emissions include pollutants such as carbon monoxide, nitrogen oxides (NOx), particulate matter (PM), and unburned hydrocarbons (UHC) generated due to incomplete combustion of fuel within the combustion chamber. The amount of these pollutants varies depending on the fuel-air mixture, compression ratio, injection timing, ambient conditions, and so forth.

In the oil and gas market and transportation sector, for example, the fuel bill is one of the contributors to the total cost of operation. The rapid expansion and abundance of natural gas in some areas of the world is driving a dramatic cost advantage of natural gas over diesel fuel, making natural gas a very economical fuel source. A dual fuel engine is based on a traditional diesel engine, with the addition of dual fuel specific hardware. When the engine is operating in dual fuel mode, natural gas is introduced into an intake system. Near the end of the compression stroke, diesel fuel is then injected. The diesel fuel ignites, and the diesel combustion causes the natural gas to burn. However, for a dual fuel operation, there is a narrow region of air to fuel ratio for which safe operation of the engine can occur at a given operating condition. For instance, if the cylinder contents are too lean (i.e., the air to fuel ratio is too high), there is the potential for misfire, and if the cylinder contents are too rich, (i.e., air to fuel ratio is too low), there is the potential for knock.

There is a need for an enhanced system and method for controlling a dual fuel engine such that the air to fuel ratio is within a desired operating region for each operating condition.

BRIEF DESCRIPTION

In accordance with one exemplary embodiment, a method is disclosed. The method includes receiving a plurality of signals from a plurality of sensors coupled to a dual fuel engine. The method further includes altering an actual speed of the dual fuel engine to obtain a predetermined air-fuel ratio in response to a changed operating condition of the dual fuel engine determined based on the plurality of signals, so as to maintain operation of the dual fuel engine between knock and misfire conditions.

In accordance with another exemplary embodiment, a system is disclosed. The system includes a signal acquisition system configured to receive a plurality of signals from a plurality of sensors coupled to a dual fuel engine. The system further includes at least one processor coupled to the signal acquisition system, the at least one processor encoded with instructions to perform processing of the plurality of signals. The instructions include a speed control module for altering an actual speed of the dual fuel engine to obtain a predetermined air-fuel ratio in response to a changed operating condition of the dual fuel engine determined based on the plurality of signals, so as to maintain operation of the dual fuel engine between knock and misfire conditions.

In accordance with yet another exemplary embodiment, a system is disclosed. The system includes a dual fuel engine and a plurality of sensors coupled to the dual fuel engine. The system further includes a control unit coupled to the dual fuel engine and the plurality of sensors. The system also includes a control unit coupled to the dual fuel engine and the plurality of sensors. The control unit includes at least one processor coupled to the signal acquisition system, the at least one processor encoded with instructions to perform processing of the plurality of signals. The instructions include a speed control module for altering an actual speed of the dual fuel engine to obtain a predetermined air-fuel ratio in response to a changed operating condition of the dual fuel engine determined based on the plurality of signals, so as to maintain operation of the dual fuel engine between knock and misfire conditions.

DRAWINGS

These and other features, aspects, and advantages of the present invention will become better understood when the following detailed description is read with reference to the accompanying drawings in which like characters represent like parts throughout the drawings, wherein.

Figure 4:
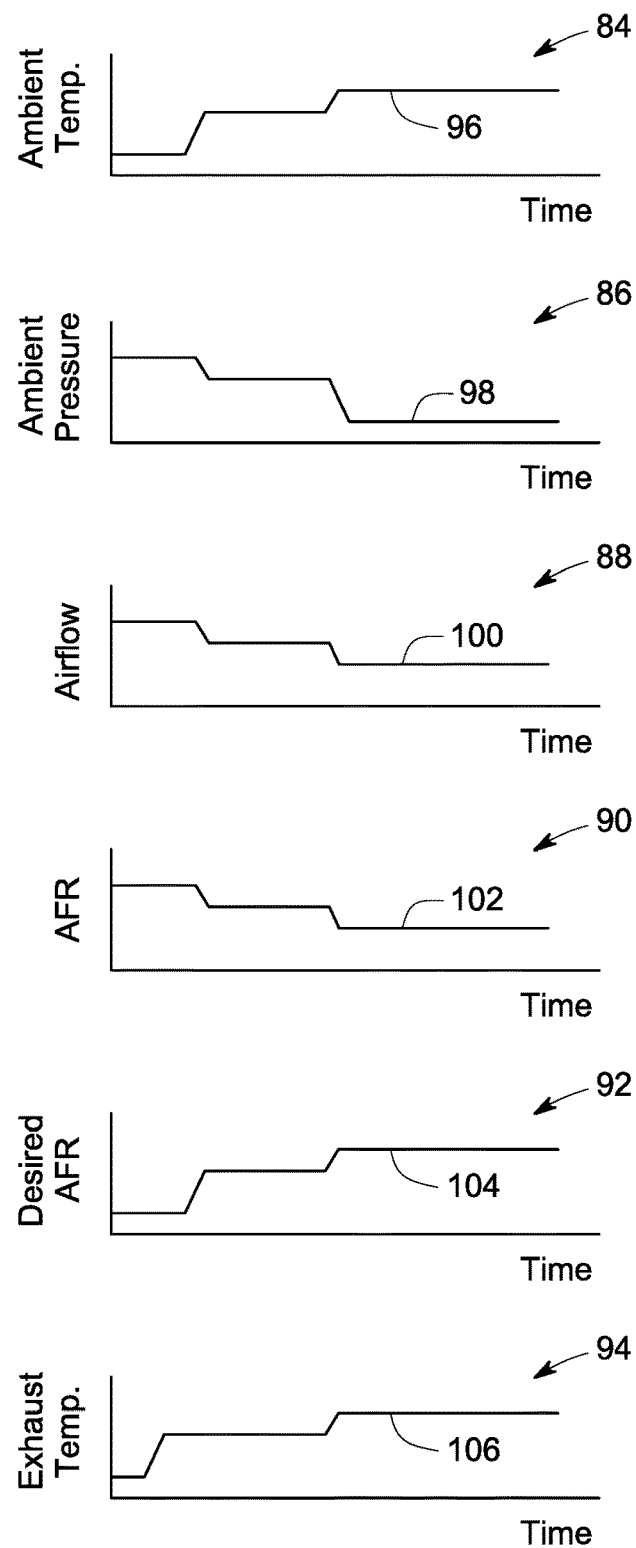
Figure 5:
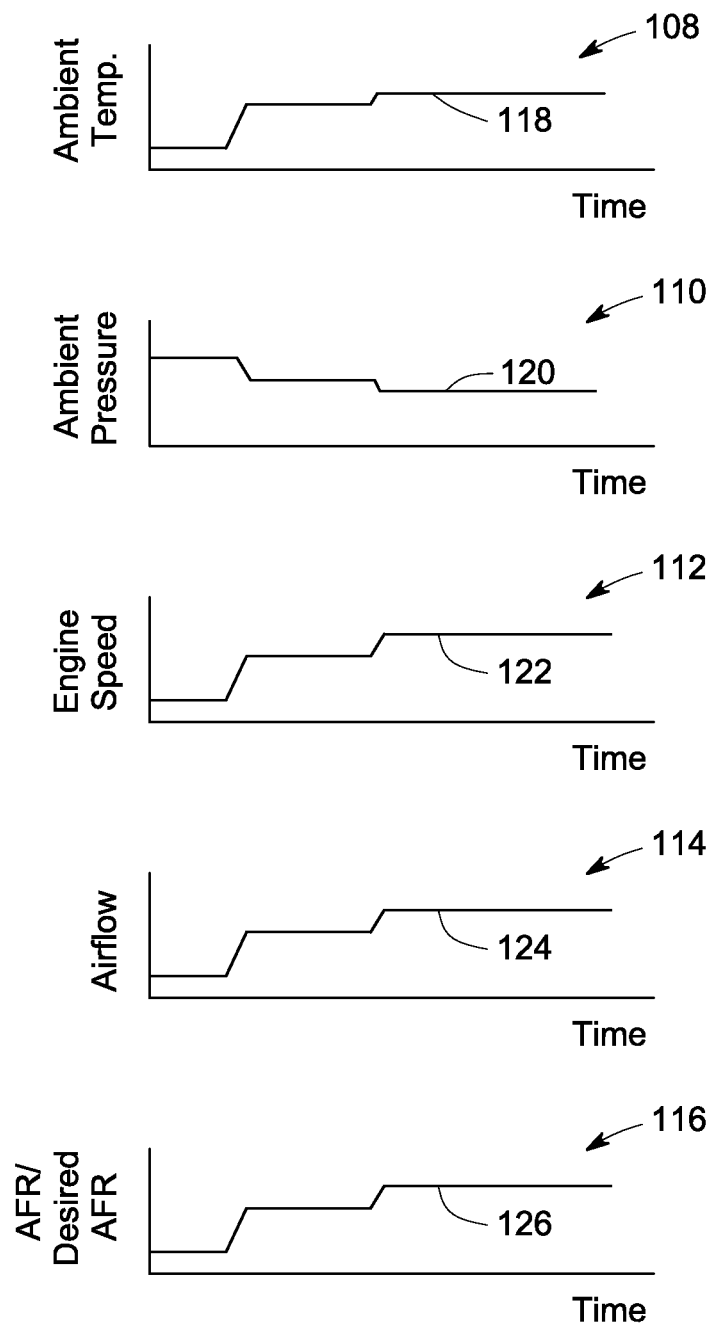

FIG. 4 shows graphical representations indicative of a variation of a plurality of parameters associated with a conventional dual fuel engine which is not subjected to an intake air flow control technique; and FIG. 5 shows graphical representations indicative of a variation of a plurality of parameters associated with a dual fuel engine which is subjected to an intake airflow control technique in accordance with an exemplary embodiment.

DETAILED DESCRIPTION

In the following specification and the claims, reference will be made to a number of terms, which shall be defined to have the following meanings.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the internet, as well as yet to be developed digital means, with the sole exception being a transitory, propagating signal.

As used herein, the terms "software" and "firmware" are interchangeable, and may include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

In accordance with the exemplary embodiments disclosed herein, a system and method of controlling a dual fuel engine is disclosed. The method includes receiving a plurality of signals from a plurality of sensors coupled to the dual fuel engine and altering an actual speed of a dual fuel engine to obtain a predetermined air-fuel ratio in response to a changed operating condition of the dual fuel engine determined based on the plurality of signals, so as to maintain operation of the dual fuel engine between knock and misfire conditions. Further, such a control technique facilitates to operate the dual fuel engine at a high substitution rate and maintain a plurality of actual emissions from the dual fuel engine within a predetermined emission limit, an actual specific fuel consumption of the dual fuel engine within a predetermined specific fuel consumption limit, a peak in-cylinder pressure within a predetermined pressure limit, and an exhaust manifold temperature within a predetermined temperature limit. In accordance with certain embodiments, a system includes a signal acquisition system configured to receive a plurality of signals from a plurality of sensors coupled to a dual fuel engine and at least one processor coupled to the signal acquisition system. The processor is encoded with instructions to perform processing of the plurality of signals. The instructions include a speed control module for altering an actual speed of the dual fuel engine to obtain a predetermined air-fuel ratio in response to the changed operating condition of the dual fuel engine determined based on the plurality of signals. In accordance with another exemplary embodiment, a vehicle incorporating a dual fuel engine and an exemplary control unit is disclosed.

Figure 1:
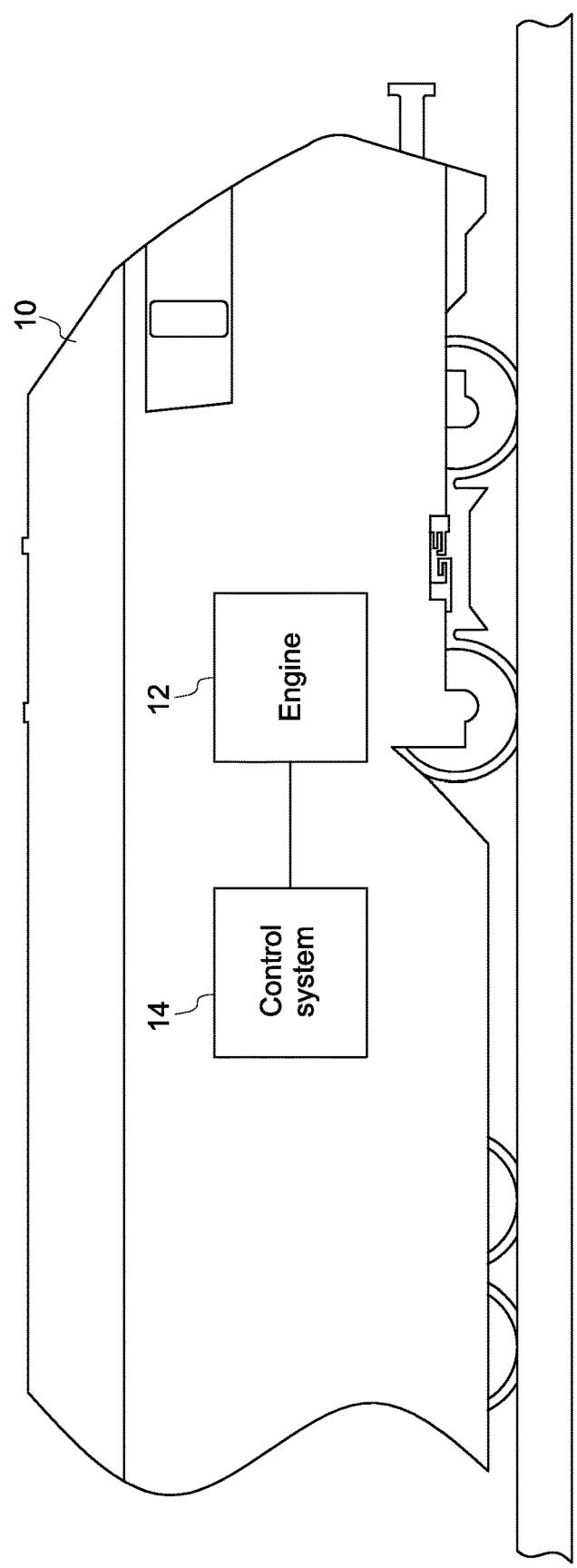
FIG. 1 is a schematic diagrammatical representation of a vehicle, for example, a locomotive moving from a first operating point to a second operating point along a predefined path in accordance with an exemplary embodiment.

Referring to FIG. 1, a schematic diagrammatical representation of a vehicle 10 moving from a first operating point to a second operating point along a predefined path is disclosed. In the illustrated embodiment, the vehicle 10 is a locomotive. Suitable vehicles include passenger and non-passenger vehicles, hybrid vehicles, off-highway vehicles, on-road vehicles (such as tractor trailers), tracked vehicles, rail vehicles, and the like. The vehicle 10 includes a dual fuel engine 12 and an exemplary control system 14 coupled to the dual fuel engine 12.

In the illustrated embodiment, the vehicle 10 is driven by the engine 12 utilizing a plurality of fuels. In the exemplary engine 12, a reduction in nitrogen oxide (NOx) and particulate matter (PM) emissions is enabled by combusting a relatively larger fraction of the premixed fuel. However, relative costs and availability of different fuels are constantly in flux. For example, in some embodiments, diesel and natural gas may be utilized to drive the engine 12. If the cost of diesel increases relative to the cost of the natural gas, more natural gas may be used resulting in reduced cost and emissions. If the cost of natural gas is increased relative to the cost of the diesel, then more diesel may be used to drive the engine 12. It should be noted herein that in certain embodiments, the vehicle 10 may also utilize other fuels instead of diesel, natural gas.

The control system 14 is configured to alter an actual speed of the dual fuel engine 12 to obtain a predetermined air-fuel ratio in response to a changed operating condition of the dual fuel engine 12, so as to maintain operation of the dual fuel engine between to maintain operation of the dual fuel engine between knock and misfire conditions. Further, the control technique facilitates to operate the dual fuel engine at a high substitution rate and maintain a plurality of actual emissions from the dual fuel engine within a predetermined emission limit, an actual specific fuel consumption of the dual fuel engine within a predetermined specific fuel consumption limit, a peak in-cylinder pressure within predetermined pressure limit, and an exhaust manifold temperature within a predetermined temperature limit. The dual fuel engine 12 and the control system 14 are explained in greater detail with reference to subsequent figures.

Figure 2:
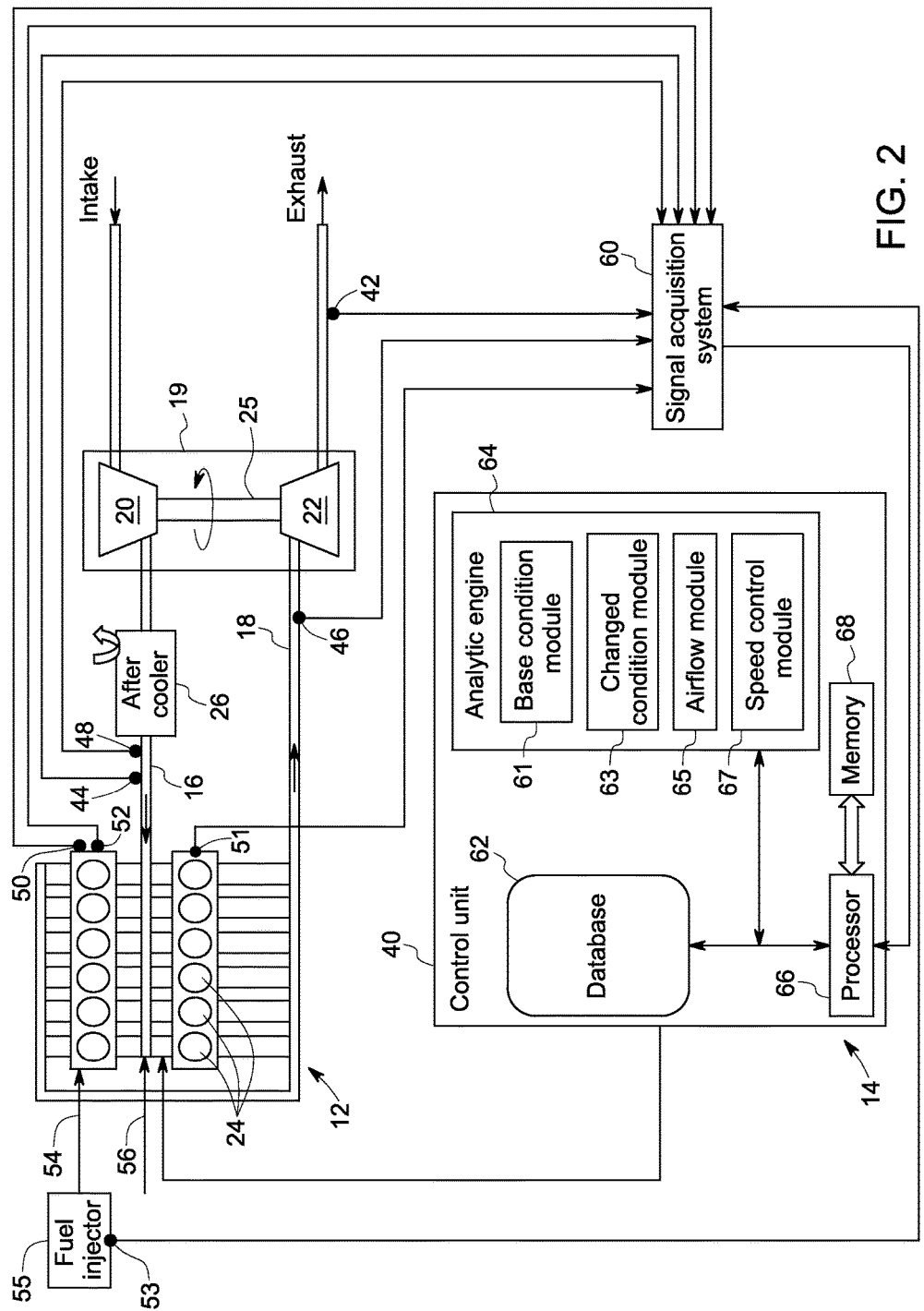
FIG. 2 is a schematic diagrammatical representation of a dual fuel engine having specific fuel consumption and exhaust emission control features in accordance with an exemplary embodiment.

Referring to FIG. 2, a schematic diagrammatical representation of the dual fuel engine 12 having specific fuel consumption and exhaust emission control features is illustrated in accordance with certain embodiments of the present invention. As discussed in further detail below, embodiments of the present invention provide monitoring and control features, such as sensors and control logic to control operation between knock and misfire conditions, specific fuel consumption, exhaust emissions, peak in-cylinder pressure, and exhaust manifold temperature of the dual fuel engine 12. For example, during conditions such as when there is a change in an operating condition (altitude/ambient temperature), peak in-cylinder pressure, exhaust manifold temperature, specific fuel consumption and exhaust emissions are maintained within acceptable/desirable levels through control techniques discussed below.

The illustrated engine 12 includes an air intake manifold 16 and an exhaust manifold 18. A turbocharger 19 includes a compressor 20 and a turbine 22 and is operated to supply compressed air to the intake manifold 16 for combustion within a plurality of cylinders 24. The turbine 22 is coupled to the exhaust manifold 18, such that the exhaust gases expand through the turbine 22, putting work onto and rotating a turbocharger shaft 25 coupled to the compressor 20. The compressor 20 draws ambient air through a filter (not shown) and provides compressed air to a heat exchanger 26. The temperature of air is increased due to compression through the compressor 20. The compressed air flows through the heat exchanger 26 such that the temperature of air is reduced prior to delivery into the intake manifold 16 of the engine 14. In one embodiment, the heat exchanger 26 is an air-to-water heat exchanger, which utilizes a coolant to facilitate removal of heat from the compressed air. In another embodiment, the heat exchanger 26 is an air-to-air heat exchanger, which utilize ambient air to facilitate removal of heat from the compressed air. In another embodiment, the heat exchanger 26 is a combination of an air-to-air heat exchanger and an air-to-water heat exchange, which utilizes both ambient air and liquid to facilitate removal of heat from the compressed air.

The control system 14 also includes a control unit 40. In one embodiment, the control unit 40 is an electronic logic controller that is programmable by a user. In the illustrated embodiment, a plurality of sensors including an emission sensor 42, an intake manifold temperature sensor 44, an exhaust manifold temperature sensor 46, an airflow sensor 48, an altitude sensor/ambient pressure sensor 50, an ambient temperature sensor 52, an engine speed sensor 51, and a fuel injection timing sensor 53 are configured to measure quantity of the exhaust emissions, intake manifold temperature, exhaust manifold temperature, airflow, altitude/ambient pressure of operation, ambient temperature, engine speed, and fuel injection timing respectively. The control unit 40 receives the corresponding output signals from the plurality of sensors 42, 44, 46, 48, 50, 51, 52, and 53.

In one embodiment, the control unit 40 is an electronic speed control unit for the engine 12. The control unit 40 is operable to produce a speed signal to control speed of the engine 12. A plurality of fuel injectors (not shown) are used for injecting a plurality of fuels (for example, diesel 54 and natural gas 56) into the plurality of cylinders 24 of the engine 12. Specifically, natural gas 56 is injected into the intake manifold 16 of the engine 12. A fuel injector 55 is used to inject diesel 54 into the plurality of cylinders 24 of the engine 12. A piston (not shown) is slidably disposed in each cylinder 24 and reciprocates between a top dead center and a bottom dead center position. The control unit 40 receives corresponding output signals from the sensors 42, 44, 46, 48, 50, 51, 52, and 53 and is operable to produce output signal to control speed of the engine 12.

A signal acquisition system 60 receives the plurality of signals from the plurality of sensors 42, 44, 46, 48, 50, 51, 52, 53 and transmits the plurality of signals to the control unit 40 configured to alter an actual speed of the dual fuel engine 12 to obtain a predetermined air-fuel ratio in response to a changed operating condition of the dual fuel engine 12 determined based on the plurality of signals. The control unit 40 includes a database 62, an analytic engine 64, a processor 66, and a memory 68.

The database 62 may be configured to store predefined information about the engine 12. For example, the database 62 may store information relating to quantity of the exhaust emissions, intake manifold temperature, exhaust manifold temperature, airflow, altitude/ambient pressure of operation, ambient temperature of operation, engine speed, fuel injection timing, reference ambient temperature, reference ambient pressure, or the like. Furthermore, the database 62 may be configured to store actual sensed/detected information from the above-mentioned sensors 42, 44, 46, 48, 50, 51, 52, and 53. The algorithm facilitates the processing of signals from the above-mentioned plurality of sensors 42, 44, 46, 48, 50, 51, 52, and 53.

In one embodiment, the database 62 may be stored in a single memory module at one location. In other embodiments, the database 62 may be stored in a plurality of memory modules in a distributed manner. The database 62 may be at least one of a SQL database, an Oracle database, and a MySQL database. In alternate embodiments, other types of databases including relationship database systems (RDBS) may be used to store the plurality of rules. It may be noted herein that in one embodiment, the database 62 is a customized database. In other embodiments, the database 62 may be an off-the-shelf database.

The analytic engine 64 is communicatively coupled to the database 62. The analytic engine 64 may be stored in the memory 68 and executable by the processor 66. In an alternate embodiment, the analytic engine 64 may also be a specialized hardware such as a Field Programmable Gate Array (FPGA). In the illustrated embodiment, the analytic engine 64 includes a base condition module 61, a changed condition module 63, an airflow module 65, and a speed control module 67.

The base condition module 61 includes codes and routines configured for determining a base operating condition of the dual fuel engine 12. The base operating conditions include a base airflow, a base air-fuel ratio, a base substitution ratio, base engine power, a base engine speed, and a base fuel injection timing (i.e. diesel injection timing) of the dual fuel engine 12. In one embodiment, the base operating condition corresponds to a sea-level operating condition of the engine 12. In another embodiment, the base operating condition corresponds to a predetermined reference ambient temperature and a reference ambient pressure of the engine 12. In one embodiment, base condition module 61 includes a set of instructions executable by the processor 66 for determining the base operating condition of the dual fuel engine 12. In another embodiment, the base condition module 61 is stored in the memory 68 and is accessible and executable by the processor 66. In either embodiment, the base condition module 61 is adapted for communication and cooperation with the processor 66 and other modules of the control unit 40.

The changed condition module 63 includes codes and routines configured to handle communications between the plurality of sensors 42, 44, 46, 48, 50, 51, 52, and 53 and the other modules of the control unit 40. In one embodiment, the changed condition module 63 includes a set of instructions executable by the processor 66 to provide the functionality for handling communications between the plurality of sensors 42, 44, 46, 48, 50, 51, 52, and 53 and the other modules of the control unit 40. In another embodiment, the changed condition module 63 is stored in the memory 68 and is accessible and executable by the processor 66. In either embodiment, the changed condition module 63 is adapted for communication and cooperation with the processor 66 and other modules of the control unit 40.

The changed condition module 63 is configured to determine the changed operating condition from the base operating condition of the dual fuel engine 12, based on the plurality of signals from the plurality of sensors 42, 44, 46, 48, 50, 51, 52, and 53. In one embodiment, the changed operating condition includes at least one of an actual altitude different from the sea-level, an actual ambient pressure different from a sea-level pressure, and a actual ambient temperature different from a sea-level temperature. In another embodiment, the changed operating condition includes at least one of an actual ambient pressure different from a reference ambient pressure, and an actual ambient temperature different from a reference ambient temperature.

The airflow module 65 includes codes and routines configured to handle communications between the plurality of sensors 42, 44, 46, 48, 50, 51, 52, 53 and the other modules of the control unit 40. In one embodiment, the airflow module 65 includes a set of instructions executable by the processor 66 to provide the functionality for handling communications between the plurality of sensors 42, 44, 46, 48, 50, 51, 52, 53 and the other modules of the control unit 40. In another embodiment, the airflow module 65 is stored in the memory 68 and is accessible and executable by the processor 66. In either embodiment, the airflow module 65 is adapted for communication and cooperation with the processor 66 and other modules of the control unit 40. The airflow module is specifically configured to determine an estimated airflow based on at least one signal from the plurality of signals from the plurality of sensors 42, 44, 46, 48, 50, 51, 52, and 53.

The speed control module 67 includes codes and routines configured to handle communications between the plurality of sensors 42, 44, 46, 48, 50, 51, 52, 53 and the other modules of the control unit 40. In one embodiment, the speed control module 67 includes a set of instructions executable by the processor 66 to provide the functionality for handling communications between the plurality of sensors 42, 44, 46, 48, 50, 51, 52, 53 and the other modules of the control unit 40. In another embodiment, the speed control module 67 is stored in the memory 68 and is accessible and executable by the processor 66. In either embodiment, the speed control module 67 is adapted for communication and cooperation with the processor 66 and other modules of the control unit 40.

The speed control module 67 is configured to alter an actual speed of the dual fuel engine 12 to obtain a predetermined air-fuel ratio in response to the changed operating condition of the dual fuel engine 12. Specifically, in one embodiment, the speed control module 67 is configured to increase the actual speed of the dual fuel engine 12 so as to increase an actual airflow from the base airflow, based on the estimated airflow, to obtain the predetermined air-fuel ratio equal to or different from the base air-fuel ratio.

The processor 66 is communicatively coupled to the database 62 and the analytic engine 64. The processor 66 may include at least one arithmetic logic unit, microprocessor, general purpose controller or other processor arrays to perform the desired computations. In one embodiment, the processor 66 is a custom hardware configured to perform functions of the analytic engine 64 and the signal acquisition system 60. In another embodiment, the processor 66 is a digital signal processor or a microcontroller. The processor 66 may also be configured to manage the contents of the database 62. In some embodiments, other type of processors, operating systems, and physical configurations are envisioned.

The memory 68 is coupled to the processor 66 and may also be optionally coupled to the other modules of the control unit 40. The memory 68 is configured to store instructions performed by the processor 66 and contents of the database 62. The memory 68 may be a non-transitory storage medium. For example, the memory 68 may be a dynamic random access memory (DRAM) device, a static random access memory (SRAM) device, flash memory, or other memory devices. In one embodiment, the memory 68 may include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, the memory 68 may be communicatively coupled to the processor 66. In an alternate embodiment, the memory 68 is an on-board memory of the processor 66.

In an exemplary embodiment, the non-transitory computer readable medium encoded with a program, instructs the processor 66 to perform functions associated with the control unit 40 for altering an actual speed of the dual fuel engine 12 to obtain a predetermined air-fuel ratio in response to a changed operating condition of the dual fuel engine 12. The program instructions include one or more functions of the database 62, the analytic engine 64, and the signal acquisition system 60.

Figure 3:
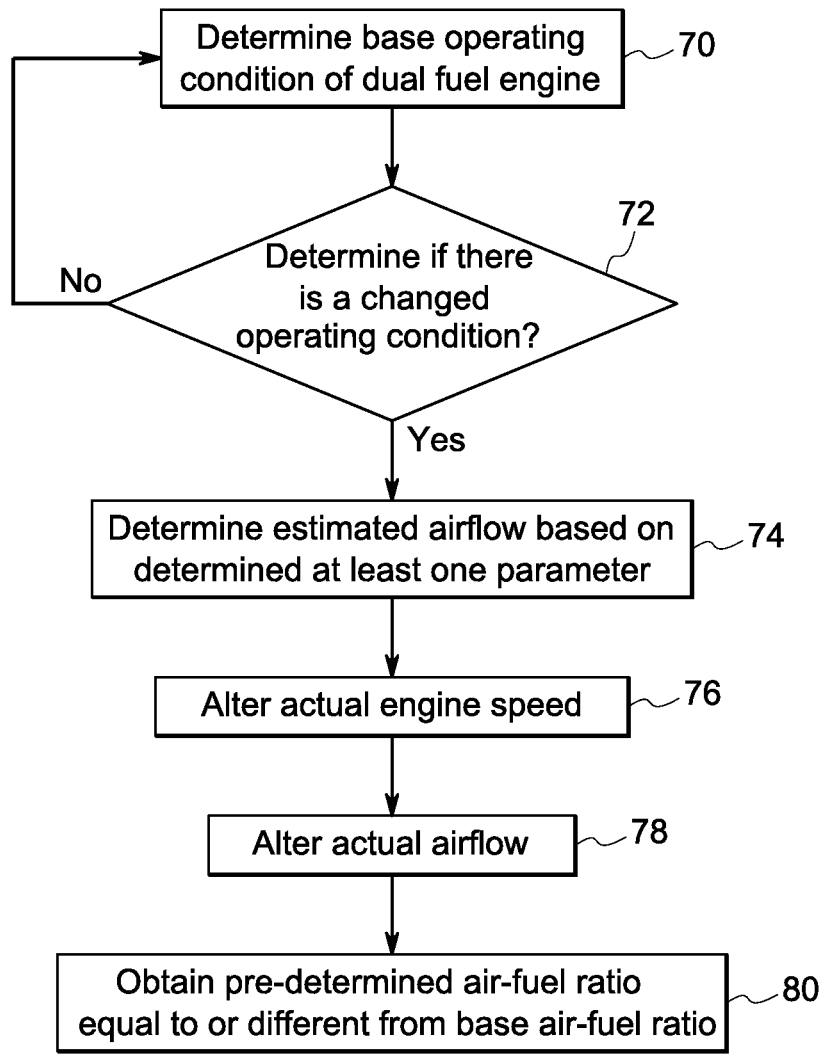
FIG. 3 is a flow chart showing a method for controlling a dual fuel engine in accordance with an exemplary embodiment.

Referring to FIG. 3, a flow chart showing a method for controlling a dual fuel engine is disclosed. The method involves determining a base operating condition of the dual fuel engine operating 70. The base operating condition includes a base airflow, a base air-fuel ratio, a base substitution ratio, a base engine speed, base engine power, and a base fuel injection timing. In one embodiment, the base operating condition corresponds to a sea-level operating condition of the engine. In another embodiment, the base operating condition corresponds to a reference ambient temperature and a reference ambient pressure of the engine. It should be noted herein that the term substitution ratio is referred to as ratio of the quantity of plurality of fuels injected into the engine. For example, if diesel and natural gas are used, the substitution ratio is the ratio of quantity of natural gas to the total quantity of fuel (natural gas and diesel) supplied to the dual fuel engine. The method further involves determining if there is a changed operating condition from the base operating condition of the dual fuel engine 72 based on a plurality of signals received from a plurality of sensors coupled to the dual fuel engine. In one embodiment, the changed operating condition includes at least one of an actual altitude different from the sea-level, an actual ambient pressure different from a sea-level pressure, and an actual ambient temperature different from a sea-level temperature. In another embodiment, the changed operating condition includes at least one of an actual ambient pressure different from a reference ambient pressure, and an actual ambient temperature different from a reference ambient temperature.

The plurality of signals are representative of the actual emissions, an intake manifold temperature, an exhaust manifold temperature, an actual engine speed, an actual fuel injection timing, and actual airflow. If a changed operating condition is detected, an estimated airflow is determined based on the plurality of signals 74. The method further involves altering the actual speed of the dual fuel engine from the base engine speed in response to the changed operating condition. As a result, an actual airflow of the engine is altered from the base airflow 78, based on the estimated airflow, to obtain a predetermined air-fuel ratio equal to or different from the base air-fuel ratio 80. In one embodiment, altering the actual speed involves increasing the actual speed of the dual fuel engine from the base engine speed in response to the changed operating condition. As a result, an actual airflow of the engine is increased from the base airflow, based on the estimated airflow, to obtain a predetermined air-fuel ratio equal to or different from the base air-fuel ratio. Such a control technique facilitates to maintain operation of the dual fuel engine between knock and misfire conditions. Further, the control technique facilitates to operate the dual fuel engine at a high substitution rate and maintain a plurality of actual emissions from the dual fuel engine within a predetermined emission limit, an actual specific fuel consumption of the dual fuel engine within a predetermined specific fuel consumption limit, a peak in-cylinder pressure within predetermined pressure limit, and an exhaust manifold temperature within a predetermined temperature limit.

In a typical diesel engine, ignition occurs by a diffusion burn flame, when diesel is injected into a combustion chamber. As such, the combustion process is not as susceptible to knock for most conditions and misfire is less of a concern. The diesel diffusion flame relies on mass transfer to sustain the combustion and is not well mixed in the combustion chamber. On the other hand, for a dual fuel/natural gas engine that is intake/port injected, ignition occurs by a pre-mixed flame in which a spark or injection of a small amount of diesel fuel initiates combustion. A flame then propagates through a combustion chamber, which has a homogeneous, or nearly homogeneous, mixture (as opposed to the diffusion flame of diesel engine). The difference between a pre-mixed flame of a natural gas/dual fuel engine and a diffusion flame of a diesel engine, results in requirement for different airflows to the two types of engines, resulting in operational differences. For instance, airflow control is important for a dual fuel engine to protect the dual fuel engine from knock and/or misfire. The two types of engines also have different emissions output as a pre-mixed natural gas/dual fuel engine generates higher unburned hydrocarbon (UHC) and carbon monoxide (CO) emissions while a diffusion flame in diesel engine generates higher particulate matter (PM) emissions. Hence there is a requirement for different control mechanisms for the different engines to meet emission regulations.

In accordance with the exemplary embodiments of the present technique, an actual speed of a dual fuel engine is altered to obtain a predetermined air-fuel ratio in response to a changed operating condition of the dual fuel engine, so as to maintain operation of the dual fuel engine between knock and misfire conditions. Further, the control technique facilitates to operate the dual fuel engine at a high substitution rate and maintain a plurality of actual emissions from the dual fuel engine within a predetermined emission limit, an actual specific fuel consumption of the dual fuel engine within a predetermined specific fuel consumption limit, a peak in-cylinder pressure within predetermined pressure limit, and an exhaust manifold temperature within a predetermined temperature limit.

FIG. 4 shows graphical representations 84, 86, 88, 90, 92, and 94 indicative of a variation of a plurality of parameters associated with a conventional dual fuel engine which is not subjected to an intake air flow control technique. Graphical representation 84 shows a curve 96 representative of a variation of ambient temperature with reference to time. Graphical representation 86 shows a curve 98 representative of a variation of ambient pressure with reference to time. Graphical representation 88 shows a curve 100 representative of a variation of intake airflow with reference to time. Graphical representation 90 shows a curve 102 representative of a variation of air-fuel ratio with reference to time. Graphical representation 92 shows a curve 104 representative of a variation of a predetermined air-fuel ratio with reference to time. Graphical representation 94 shows a curve 106 representative of a variation of exhaust temperature with reference to time.

FIG. 5 shows graphical representations 108, 110, 112, 114, and 116, indicative of a variation of a plurality of parameters associated with a dual fuel engine which is subjected to an exemplary intake air flow control technique.

Graphical representation 108 shows a curve 118 representative of a variation of ambient temperature with reference to time. Graphical representation 110 shows a curve 120 representative of a variation of ambient pressure with reference to time. Graphical representation 112 shows a curve 122 representative of a variation of engine speed with reference to time. Graphical representation 114 shows a curve 124 representative of a variation of intake airflow with reference to time. Graphical representation 116 shows a curve 126 representative of a variation of a predetermined air-fuel ratio/air-fuel ratio with reference to time.

With reference to FIG. 4, the air-fuel ratio and the airflow are directly related to the ambient pressure and temperature. When the ambient temperature increases and the ambient pressure reduces (i.e., higher altitude), the airflow reduces, when the engine does not have airflow control. However, such a reduction of the airflow may not be desirable, especially in a dual fuel engine.

With reference to FIG. 5, the airflow is increased by increasing the engine speed, for achieving a predetermined airflow/air-fuel ratio so as to achieve a high substitution ratio and operation between knock and misfire conditions. It should be noted herein that the engine is operated at the same power level when the engine speed is increased.

In accordance with the embodiments of the present invention, engine speed can be varied at the same power level which results in a predetermined air-fuel ratio. As a result, a need for active air-fuel ratio control mechanisms such as compressor recirculation, turbine bypass, or the like is eliminated/reduced. By controlling the engine speed to obtain the predetermined air-fuel ratio, the exemplary dual fuel engine can operate between misfire and knock, while maintaining exhaust emissions, fuel consumption, exhaust manifold temperature, and peak in-cylinder pressure within specified limits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
receiving a plurality of signals from a plurality of sensors coupled to a dual fuel engine; and
altering an actual speed of the dual fuel engine to obtain a predetermined air-fuel ratio in response to a changed operating condition of the dual fuel engine determined based on the plurality of signals, so as to maintain operation of the dual fuel engine between knock and misfire conditions.

2. The method of claim 1, further comprising determining a base operating condition of the dual fuel engine.

3. The method of claim 2, wherein the base operating condition comprises a base airflow, a base air-fuel ratio, a base substitution ratio, a base engine speed, base engine power, and a base fuel injection timing.

4. The method of claim 3, further comprising determining the changed operating condition from the base operating condition of the dual fuel engine operating at same power level, based on the plurality of signals.

5. The method of claim 4, wherein the plurality of signals is representative of a plurality of actual emissions, an intake manifold temperature, an exhaust manifold temperature, an actual engine speed, an actual fuel injection timing, and an actual airflow.

6. The method of claim 5, further comprising determining an estimated airflow based on at least one signal from the plurality of signals.

7. The method of claim 6, wherein the altering comprises altering the actual speed of the dual fuel engine from the base engine speed in response to the changed operating condition.

8. The method of claim 7, further comprising altering the actual airflow from the base airflow, based on the estimated airflow, to obtain the predetermined air-fuel ratio equal to or different from the base air-fuel ratio.

9. The method of claim 4, wherein the base operating condition corresponds to a sea-level operating condition of the dual fuel engine.

10. The method of claim 9, wherein the changed operating condition comprises at least one of an actual altitude different from the sea-level, an actual ambient temperature different from a sea-level temperature, and an actual ambient pressure different from a sea-level pressure.

11. The method of claim 2, wherein the base operating condition corresponds to a reference ambient temperature and a reference ambient pressure of the dual fuel engine.

12. The method of claim 11, wherein the changed operating condition comprises at least one of an actual ambient temperature different from a reference ambient temperature and an actual ambient pressure different from a reference ambient pressure.

13. The method of claim 1, further comprising maintaining a plurality of actual emissions from the dual fuel engine within a predetermined emission limit, an actual specific fuel consumption of the dual fuel engine within a predetermined specific fuel consumption limit, an actual in-cylinder peak pressure within a predetermined pressure limit, and an exhaust manifold temperature within a predetermined temperature limit.

14. A system comprising:
a signal acquisition system configured to receive a plurality of signals from a plurality of sensors coupled to a dual fuel engine; and
at least one processor coupled to the signal acquisition system, the at least one processor encoded with instructions to perform processing of the plurality of signals, the instructions including:
a speed control module for altering an actual speed of the dual fuel engine to obtain a predetermined air-fuel ratio in response to a changed operating condition of the dual fuel engine determined based on the plurality of signals, so as to maintain operation of the dual fuel engine between knock and misfire conditions.

15. The system of claim 14, wherein the instructions further include a base condition module for determining a base operating condition comprising a base airflow, a base air-fuel ratio, a base substitution ratio, a base engine speed of the dual fuel engine, base engine power, and a base fuel injection timing.

16. The system of claim 15, wherein the instructions further include a changed condition module for determining the changed operating condition from the base operating condition of the dual fuel engine operating at same power level, based on the plurality of signals.

17. The system of claim 16, wherein the instructions further include an airflow module for determining an estimated airflow based on at least one signal from the plurality of signals.

18. The system of claim 17, wherein the speed control module alters the actual speed of the dual fuel engine from the base engine speed in response to the changed operating condition.

19. The system of claim 18, wherein the speed control module alters the actual speed of the dual fuel engine so as to alter an actual airflow from the base airflow, based on the estimated airflow, to obtain the predetermined air-fuel ratio equal to or different from the base air-fuel ratio.

20. The system of claim 14, wherein the plurality of sensors comprises at least one of an altitude sensor, an ambient pressure sensor, and an ambient temperature sensor.

21. The system of claim 14, wherein the plurality of sensors comprises an emission sensor, an intake manifold temperature sensor, an exhaust manifold temperature sensor, an engine speed sensor, a fuel injection timing sensor, and an airflow sensor.

22. The system of claim 14, wherein the instructions further include the speed control module for altering the actual speed of the dual fuel engine so as to obtain the predetermined air-fuel ratio in response to the changed operating condition of the dual fuel engine determined based on the plurality of signals, so as to maintain a plurality of actual emissions from the dual fuel engine within a predetermined emission limit, an actual specific fuel consumption of the dual fuel engine within a predetermined specific fuel consumption limit, an actual in-cylinder peak pressure within a predetermined pressure limit, and an exhaust manifold temperature within a predetermined temperature limit.

23. A vehicle comprising:
a dual fuel engine;
a plurality of sensors coupled to the dual fuel engine;
a control unit coupled to the dual fuel engine and the plurality of sensors; the control unit comprising:
a signal acquisition system coupled to the plurality of sensors and configured to receive a plurality of signals from a plurality of sensors; and
at least one processor coupled to the signal acquisition system, the at least one processor encoded with instructions to perform processing of the plurality of signals, the instructions including:
a speed control module for altering an actual speed of the dual fuel engine to obtain a predetermined air-fuel ratio in response to the changed operating condition of the dual fuel engine determined based on the plurality of signals, so as to maintain operation of the dual fuel engine between knock and misfire conditions.

24. The system of claim 23, wherein the instructions further include a base condition module for determining a base operating condition comprising a base airflow, a base air-fuel ratio, a base substitution ratio, a base engine speed of the dual fuel engine operating, base engine power, and a base fuel injection timing.

25. The system of claim 24, wherein the instructions further include a changed condition module for determining the changed operating condition from the base operating condition of the dual fuel engine operating at same power level, based on the plurality of signals.

26. The system of claim 25, wherein the instructions further include an airflow module for determining an estimated airflow based on at least one signal from the plurality of signals.

27. The system of claim 26, wherein the speed control module alters the actual speed of the dual fuel engine from the base engine speed in response to the changed operating condition.

28. The system of claim 27, wherein the speed control module alters the actual speed of the dual fuel engine so as to alter an actual airflow from the base airflow, based on the estimated airflow, to obtain the predetermined air-fuel ratio equal to or different from the base air-fuel ratio.

29. The system of claim 23, wherein the instructions further include the speed control module for altering the actual speed of the dual fuel engine so as to obtain the predetermined air-fuel ratio in response to the changed operating condition of the dual fuel engine determined based on the plurality of signals, so as to maintain a plurality of actual emissions from the dual fuel engine within a predetermined emission limit, an actual specific fuel consumption of the dual fuel engine within a predetermined specific fuel consumption limit, an actual in-cylinder peak pressure within a predetermined pressure limit, and an exhaust manifold temperature within a predetermined temperature limit.

* * * * *